March 5, 1968   T. J. SLONE ET AL   3,371,519
POROSIMETER

Filed March 11, 1966   3 Sheets-Sheet 1

INVENTORS
THOMAS J. SLONE
LEONARD J. ORBECK
BY Herman L Gordon
ATTORNEY

INVENTORS
THOMAS J. SLONE
LEONARD J. ORBECK
BY Herman L Gordon
ATTORNEY

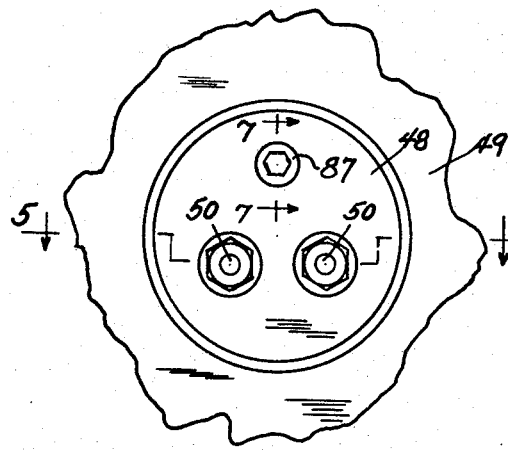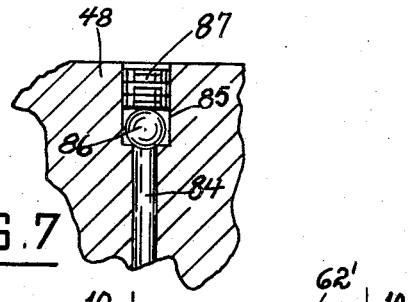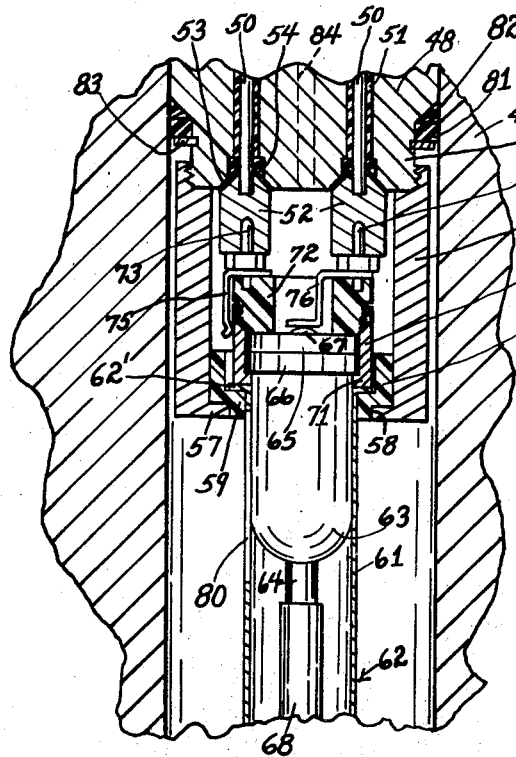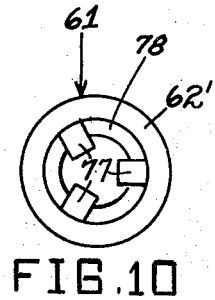
FIG.6
FIG.7
FIG.8
FIG.10
FIG.9
INVENTORS
THOMAS J. SLONE
LEONARD J. ORBECK
BY Herman L. Gordon
ATTORNEY United States Patent Office 3,371,519
Patented Mar. 5, 1968

3,371,519
POROSIMETER
Thomas J. Slone, Silver Spring, and Leonard J. Orbeck, Hyattsville, Md., assignors to American Instrument Co., Inc., Silver Spring, Md.
Filed Mar. 11, 1966, Ser. No. 533,560
10 Claims. (Cl. 73—38)

ABSTRACT OF THE DISCLOSURE

A porosimeter consisting of a pressure vessel with a penetrometer mounted therein and a controllable source of pressure fluid connected to the pressure vessel. The penetrometer has a stem provided with a conductive sleeve surrounding the stem. The penetrometer contains mercury, and the mercury in the stem and the sleeve form a condenser whose capacitance changes in accordance with changes in the height of the lower end of the mercury column in the stem. The penetrometer has a removable top cover disc provided with a central electrode exposed to the mercury in the interior of the penetrometer. The changes in height of the bottom of the mercury column are caused by penetration of the mercury into the pores of a sample contained in the penetrometer resulting from the pressure applied by the pressure fluid. The sleeve and electrode are electrically connected into a capacitance bridge so as to form one arm thereof. Changes in capacitance are measured on a meter connected to the output terminals of the bridge. These changes correspond to changes in the position of the lower end of the mercury column in the penetrometer stem.

---

This invention relates to apparatus for measuring the sizes and volumes of the pores of porous materials, and more particularly to a porosimeter of the type employing the mercury intrusion method.

A main object of the invention is to provide a novel and improved apparatus for determining the pore size spectrum of penetrable or porous material by the mercury intrusion method, the apparatus being simple in construction, being easy to operate, and providing highly accurate readings which can be readily interpreted.

A further object of the invention is to provide an improved porosimeter which is completely hydraulic (gas free) and which can be employed to measure a wide range of sizes of pores in solid materials, for example, pores ranging in size from the order of 75 microns to 30 Angstroms in diameter and pore volumes of the order of 0.20 cc. per given sample weight.

A still further object of the invention is to provide an improved porosimeter which includes a high pressure source capable of developing hydraulic pressure over a continuous wide range of values and which includes means to deliver the hydraulic pressure to a pressure chamber and to simultaneously provide respective accurate electrical indications of fluid pressure and resultant volume of intrusion, whereby data can be readily obtained for plotting a curve of pore volume against applied hydraulic pressure for the material under test, which thus gives the pore size spectrum of the material.

A still further object of the invention is to provide an improved porosimeter of the mercury intrusion type wherein the indications of mercury intrusion are derived electrically in a simple and direct manner, making it unnecessary to read a column of mercury visually and thereby eliminating a serious source of error present in previously known instruments of this type, the intrusion indications being presented as changes in electrical capacity between the mercury intrusion column and a surrounding metallic sheath.

Further objects and advantages of the invention will become apparent from the following description and claims, and from the accompanying drawings, wherein:

FIGURE 3 is an enlarged cross-sectional view taken substantially on line 3—3 of FIGURE 2.

FIGURE 6 is an enlarged fragmentary horizontal plan view taken substantially on the line 6—6 of FIGURE 5.

FIGURE 7 is an enlarged cross-sectional detail view taken substantially on line 7—7 of FIGURE 6.

FIGURE 8 is an enlarged vertical cross-sectional view showing the detailed structure of a portion of the assembly of FIGURE 5.

FIGURE 9 is an enlarged elevational view, partly broken away, of the penetrometer shield employed in the assembly of FIGURE 5.

FIGURE 10 is a horizontal top plan view taken substantially on the line 10—10 of FIGURE 9.

In a porosimeter employing the mercury intrusion method as disclosed in U.S. Patent No. 3,073,357 or 3,022,657 to W. C. Hampton, or in U.S. Patent No. 2,886,-964 to J. J. Shapiro et al., a gas-free hydraulic system is used to transmit pressure from a suitable pressure generator to a pressure vessel containing a penetrometer having a chamber in which a quantity of sample material is disposed, the penetrometer (with the sample therein) having been previously filled with mercury in any suitable manner, for example, by means of the apparatus and method disclosed in any one of the above-cited patents. A suitable hydraulic liquid, such as alcohol, is employed as the pressure transfer medium to transfer the pressure from the pressure generator to the pressure vessel and to cause the mercury in the penetrometer to be forced into the pores of the sample. By reading the position of the bottom of the mercury column in the penetrometer stem and the corresponding pressure in steps at appropriate intervals over a range of pressures during a test, data can be obtained which will give the volumes of penetration of the mercury into the sample (which is of known weight) at the various pressures, from which the pore spectrum of the sample material can be determined.

The apparatus of the present invention employs substantially the same technique as described in the above-mentioned prior patents except that with the apparatus of the present invention the necessity of visually reading the position of the bottom of the mercury column in the penetrometer stem is eliminated, and instead an electrical signal corresponding to this information is derived and is utilized for the purpose of determining the volume of penetration of the mercury into the pores of the sample material.

Figure 1:
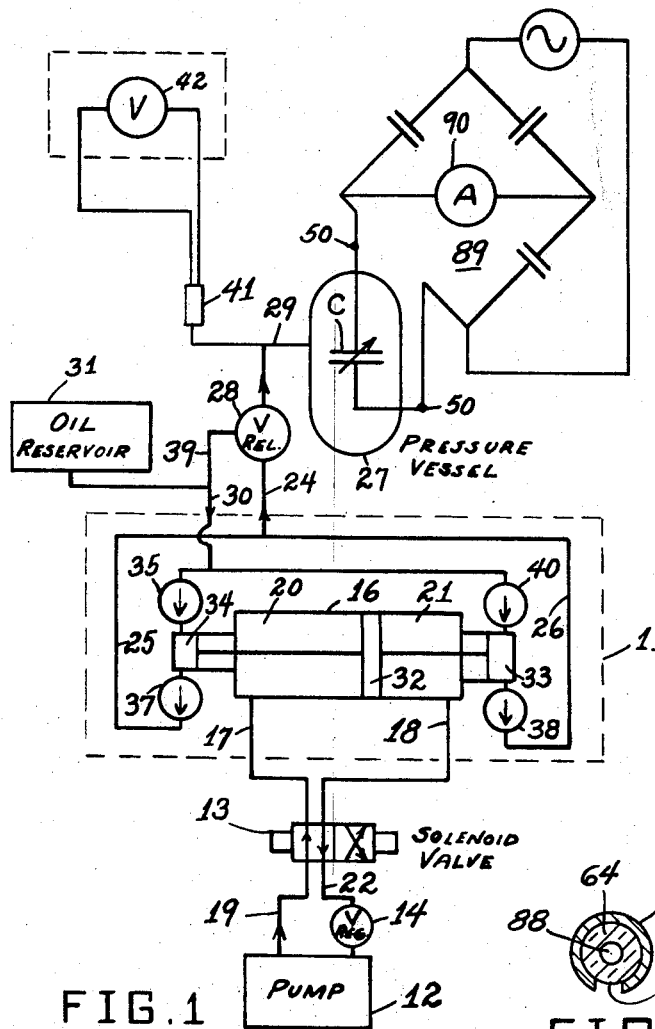
FIGURE 1 is a schematic diagram showing in simplified form the fluid conduit connections and the electrical connections of a typical porosimeter constructed in accordance with the present invention.

Referring to the drawings, and more particularly to FIGURE 1, 11 designates a pressure generator comprising a double-ended fluid pressure intensifier 16 activitated from a pump 12 through a solenoid-operated reversing valve 13 and a pressure- regulating valve 14. The arrangement thus provides a range of output pressures comprising the combined span of the output pressures available from both sections of the double-ended fluid pressure intensifier 16. Fluid lines 17 and 18 lead from the solenoid valve 13 to the respective sections 20 and 21 of the fluid pressure intensifier. In one position of valve 13, pump outlet line 19 is connected to the line 17 leading to the working space of intensifier section 20, while the working fluid of section 21 is allowed to pass through line 18 to the pump return line 22 (and through the pressure-regulating valve 14). In the other position of solenoid valve 13, the connections of lines 17 and 18 are reversed.

The high-pressure output portions of the intensifier sections are connected through suitable check valves 37, 38 and lines 25 and 26 to an output line 24, which in turn is connected to the pressure vessel 27 through a pressure relief bypass valve 28 and a conduit 29. The bypass conduit 39 of relief valve 28 is connected to a return line 30 which is connected through suitable return conduits and check valves 35, 40 to the respective fluid pressure intensifier output portions to allow fluid to flow as required to and from the liquid reservoir 31 connected to return line 30. Thus, in the position shown in FIGURE 1, output fluid under pressure from pump 12 is admitted to the working cylinder of the low-range intensifier section 20, moving piston 32 to the right, as viewed in FIGURE 1, developing output pressure in line 26 from output chamber 33. At this time the other output chamber 34 receives fluid from reservoir 31 through line 30 and check valve 35. When the valve 13 is reversed, the pump pressure fluid is delivered to the high-range intensifier section working chamber 21, and the smaller output chamber 34 is effective, providing a higher range of output pressures in line 24.

The pressure of the fluid admitted through line 29 into the pressure vessel 27 is measured in a conventional manner by means of a pressure-sensitive electrical transducer unit 41 communicatively connected to the conduit 29. The electrical output of the transducer 41 is indicated by a suitably calibrated meter 42 connected to the transducer.

Figure 5:
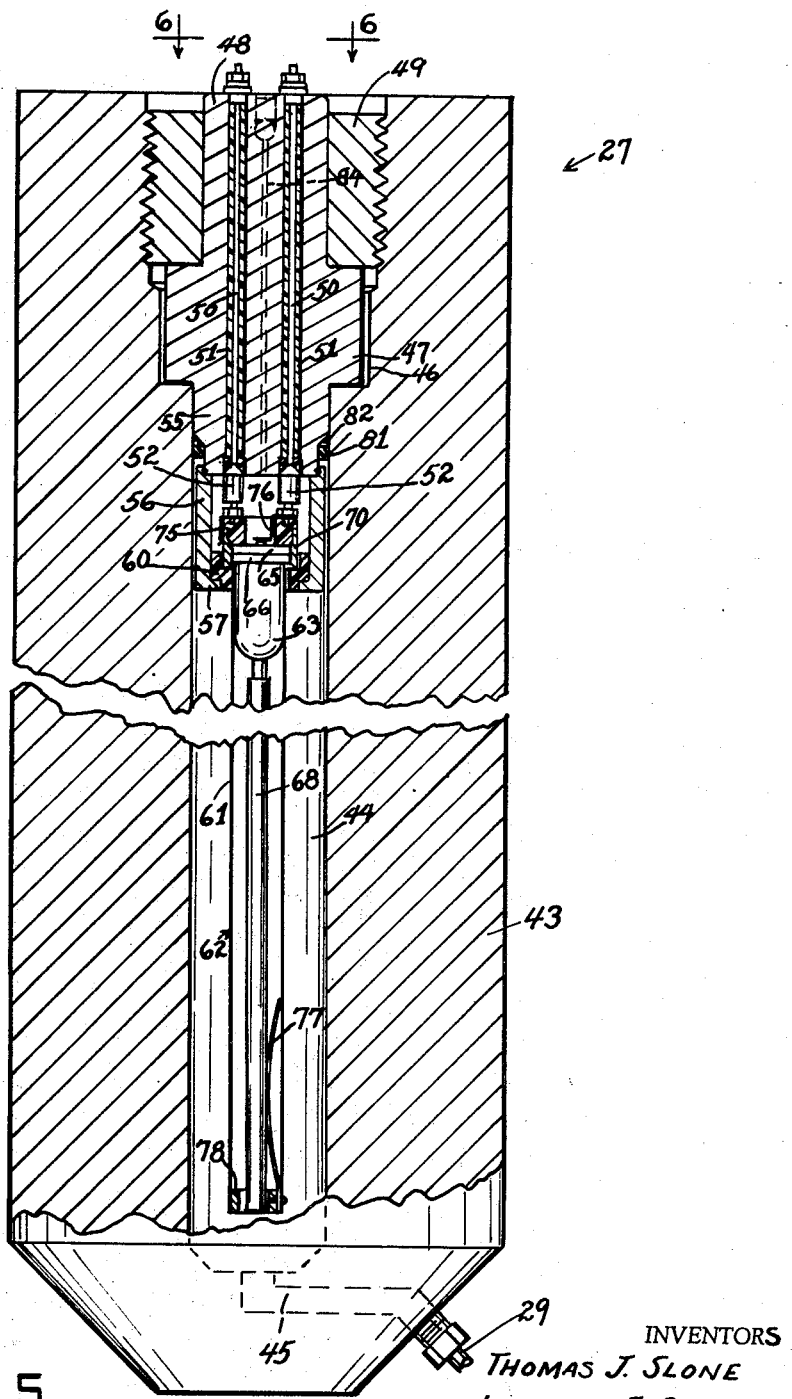
FIGURE 5 is a vertical cross-sectional view, partly in elevation, of the pressure chamber of FIGURE 1, with the penetrometer of FIGURE 2 mounted therein, said view being taken substantially on the line 5—5 of FIGURE 6, but to a reduced scale.

The pressure vessel 27 comprises a thick-walled vertical chamber 43 having a substantially cylindrical main cavity 44 whose bottom end leads to a passage 45 to the outer end of which the conduit 29 is connected. The upper portion of the chamber 43 has the counterbore 46 in which is seated the relatively thick flange 47 of a removable plug 48. Plug 48 is retained in the top portion of chamber 43, as shown in FIGURE 5, by an anchor ring 49 which is threadedly engaged in the top portion of the chamber and which surrounds the top end of plug 48 and clampingly engages on the top surface of flange 47.

Extending through spaced parallel longitudinal bores in plug 48 are a pair of terminal studs 50, 50 suitably insulated from the plug by insulating sleeves 51, 51. Secured to the bottom ends of the studs are enlarged female terminal sleeves or cups 52, 52. The top ends of the sleeve members 52, 52 are substantially frusto-conical in shape and are received in correspondingly shaped counterbores provided in the bottom end of plug 48 around the studs 50, 50. Suitable insulators 53 and sealing packings 54 are provided between the top ends of the sleeve members 52 and plug 48.

The lower end portion of plug 48 is reduced in diameter, as shown at 55, and a penetrometer supporting cup 56 is threadedly secured thereto. The bottom wall 57 of the cup 56 is formed with a central aperture 58. An annular insulating bushing 60 is seated in the bottom of cup 56, said bushing having an inwardly offset depending collar portion 59 which is received in the aperture 58. Extending through the collar portion 59 is an elongated generally tubular metal penetrometer sheath 61 having a top supporting flange 62' which engages supportingly on and which is received in the bushing 60, as shown in FIGURE 8.

Figure 2:
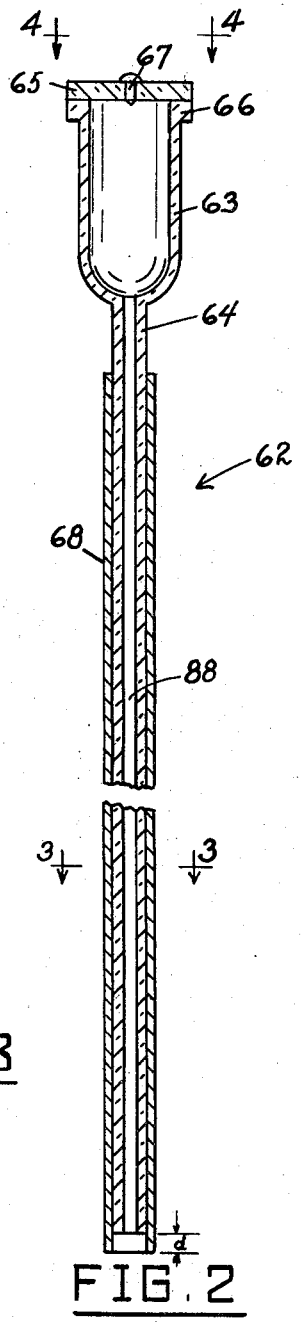
FIGURE 2 is a vertical cross-sectional view taken through a penetrometer assembly employed in the pressure vessel of the porosimeter of FIGURE 1.
Figure 4:
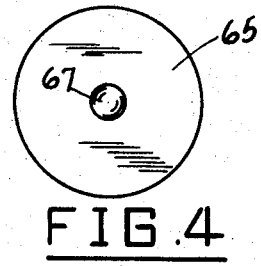
FIGURE 4 is an enlarged horizontal top plan view of the penetrometer taken substantially on line 4—4 of FIGURE 2.

Designated generally at 62 is a penetrometer assembly comprising the enlarged bell-shaped top portion 63 and the depending straight tubular stem portion 64. A circular cap 65 is sealingly and removably engaged on the top rim or flange 66 of bell portion 63. The penetrometer 63, 64 and disc-shaped cap 65 are made of glass or similar insulating material. Cap 65 is provided with a central headed metal contact pin 67 sealingly secured therein with its pointed bottom end exposed to the interior of bell portion 63, as shown in FIGURE 2. A metal sleeve 68 is secured around the stem 64, extending for the major portion of the length of the stem and a short distance $d$ below the bottom end of the stem, as shown in FIGURE 2, for the purpose of minimizing capacitive "end effect" as will be presently described. Sleeve 68 may be substantially C-shaped in cross-section, as shown in FIGURE 3, thereby providing a viewing slot 69.

The penetrometer 63, 64 is snugly received in the sheath 61 in the manner shown in FIGURES 5 and 8, with the superimposed cap 65 and rim 66 received in a metal annular retaining ring or cup 70 having an inturned flange 71 supportingly engaged beneath rim 66. Ring 70 is supported on flange 62'. The top portion of ring 70 is threadedly engaged on an annular locking cap 72 of insulating material which bears lockingly on the glass cap 65. Secured on the annular cap 72 are upstanding male prongs 73 and 74 received in the respective female terminal sleeves or cups 52, 52. A first contact spring 75 of right-angled shape is conductively clamped between prong 73 and cap 72, the depending arm of spring 75 engaging ring 70, so that prong 73 and one terminal stud 50 are conductively connected to sheath 61. A generally Z-shaped second contact spring 76 is similarly conductively secured to prong 74 and engages pin 67, whereby the mercury contained in the penetrometer 63, 64 is conductively connected to prong 74 and the other terminal stud 50.

The sheath 61 is provided with a plurality of inwardly bowed interior contact leaf springs 77 which conductively engage the sleeve 68, thus electrically connecting sleeve 68 with prong 73 (through ring 70 and spring 75). As shown in FIGURE 9, the bowed leaf springs 77 are clampingly secured at their bottom ends between a rigid collar 78 and the inside surface of the bottom end portion of sheath 61 by fastening screws 79 engaged through the sheath 61 and the bottom ends of the springs 77 and threadedly engaged in the rigid ring 78. As shown in FIGURE 10, three equally spaced contact rings 77 may be employed.

The upper portion of sheath 61 is formed with a plurality of vertically elongated slots or apertures 80 to allow free flow of pressure fluid (for example, oil) through the space adjacent the penetrometer 63, 64, and to minimize residual capacitance between the penetrometer and the shield.

A resilient deformable gasket ring 81 and an annular packing element 82 are provided on the upper portion of reduced plug element 55, being supported by the provision of a spring lock ring 83 seated in a suitable annular groove provided therefor in element 55. The sealing elements 81, 82 provide a fluid-tight seal between plug 48 and the wall of cavity 44.

Plug 48 is provided with a longitudinal bleeder passage 84 extending from the bottom end of the plug to a counterbore 85 in the top end of the plug. A sealing ball 86 is seated in the counterbore, being urged into sealing position on the top rim of passage 84 by a locking screw plug 87 threadedly engaged in the counterbore above the ball, as shown in FIGURE 7. The provision of the bleeder passage 84 allows the cavity 44 to be emptied of air when the cavity is being filled with oil from the reservoir 31 at the beginning of a test, as will be presently described. The engagements of flange 62' with rings 60 and 70 are not sealing engagements but are merely mechanical, so that the oil is free to flow into the interior of cup 56.

As shown in FIGURE 1, the terminal studs 50, 50 are represented as the terminals of a capacitance C, comprising the capacitance between the metal sleeve 68 and a column of mercury in the bore 88 of the penetrometer stem 64. This capacitance is connected into a capacity bridge 89 as one of the arms thereof, and, assuming the bridge to be balanced at a starting condition, changes in the height of the bottom end of the mercury column will cause unbalance of the bridge. The cross-sectional area of the bore 88 is constant so that the indicating meter 90 of the bridge can be suitably calibrated to indicate the changes in capacity as changes in volume. The "end effect" (capacitance between the inner mercury conductor and the vessel ground) is reduced to a negligible magnitude by extending the sleeve 68 a short distance $d$ below the end of the penetrometer stem 64, as above described. The value $d$ is of the order of between ¼ and ⅛ inch.

In performing a test, a known weight of the sample is placed in the penetrometer bell portion 63 and the cap 65 is sealingly secured thereon by clamping it to rim 66 by means of the cooperating clamping members 70 and 72. A sealing film of silicone grease may be employed between cap 65 and rim 66.

The penetrometer may then be filled with mercury in a known manner, for example, in the manner described in U.S. Patents Nos. 3,022,657, 2,886,964 or 3,073,357, as above mentioned. Thus, the penetrometer may be first placed in a vacuum chamber, stem down. Mercury is then admitted into the vacuum chamber, covering the lower end of the penetrometer stem. The vacuum chamber may then be slowly vented, whereby the mercury is forced up the penetrometer stem, filling the voids communicating with and around the sample. The mercury-filled penetrometer is then installed in the pressure chamber in the manner shown in FIGURE 5. The bleeder plug 87 is unscrewed to allow air to vent from the cavity 44. The fluid pressure generator assembly 11 is first operated until all the air is purged from the cavity 44 through the bleeder passage 84 (oil rises into counterbore 85). The bleeder plug 87 is replaced and is closed tightly, forcing sealing ball 86 onto its seat. The fluid pressure generator assembly is then further activated to force the mercury up through the penetrometer stem. As the fluid pressure is gradually increased, readings are taken at intervals on meter 42 and meter 90, whereby the data corresponding to readings of pressure and capacitance (and/or pore volume) is obtained. As above mentioned, meter 90 may be calibrated directly in volume units, if so desired. If the meter is calibrated in capacitance units, the penetrometer may be calibrated for conversion of changes in column height into capacitance change, or vice versa. Calibration of the penetrometer is done with the unit outside the pressure chamber 43. The position of the bottom end of the mercury column can be observed through the slot 69. Thus, data points of capacitance versus mercury position can be taken and plotted, providing a calibration curve by means of which the subsequent capacitance readings taken during a test on a sample may be reconverted into volumetric values.

The capacitance bridge 89 may be replaced by any other suitable type of impedance bridge responding to changes of capacitance in one of its arms, or by any other suitable capacitance indicating means.

While a specific embodiment of an improved porosimeter has been disclosed in the foregoing description, it will be understood that various modifications within the spirit of the invention may occur to those skilled in the art. Therefore it is intended that no limitation be placed on the invention except as defined by the scope of the appended claims.

What is claimed is:

1. In a porosimeter, a pressure vessel, a penetrometer mounted in said pressure vessel and having a depending stem open at its bottom end and adapted to contain conductive liquid, means to admit pressure fluid into the pressure vessel, a conductive sleeve element mounted on and substantially surrounding said stem and being in capacitive relation to conductive liquid contained in the stem, a non-conductive removable sealing cover element on the top end of the penetrometer, conductive electrode means mounted in said cover element, said electrode means being exposed to the interior of the penetrometer and adapted to be engaged by conductive liquid in said interior, capacitance indicating means, and circuit means connecting said sleeve element and said electrode means to said capacitance indicating means, whereby charges in the position of the lower end of a column of conductive liquid in said stem will cause the capacitance between the conductive liquid and the sleeve element to change and will provide corresponding changes in the readings of said capacitance indicating means.

2. The structural combination set forth in claim 1, wherein said penetrometer includes a generally bell-shaped sample-receiving top portion and said sealing cover element comprises a disc member sealingly engaged on the top rim of said bell-shaped portion.

3. The structural combination set forth in claim 2, and wherein said electrode means comprises a headed metal pin extending substantially centrally through said disc member.

4. The structural combination set forth in claim 2, and wherein said circuit means includes a depending metal sheath surrounding said bell-shaped top portion and surrounding and being spaced from said conductive sleeve element, yieldable contact spring means secured inside said sheath and conductively engaging said sleeve element, a pair of spaced terminal elements in the wall of the pressure vessel, respective conductor means connecting said metal sheath and said electrode means to said terminal elements, and additional respective conductor means connecting the spaced terminal elements to the capacitance indicating means.

5. The structural combination set forth in claim 1, and wherein said capacitance indicating means comprises a capacitance bridge circuit, with said sleeve element and electrode means connected as one of the arms of the bridge circuit.

6. The structural combination set forth in claim 1, and wherein said penetrometer includes a generally bell-shaped sample-receiving top portion provided with a top flange and said sealing cover element comprises a rigid cover member sealingly engaged on said top flange, a bottom ring member surrounding said bell-shaped portion and underlying said top flange, and a top ring member threadedly engaged with said bottom ring member and exerting clamping force on said cover member.

7. The structural combination set forth in claim 6, and wherein said bottom ring member is of conductive material and said top ring member is of non-conductive material, and wherein said circuit means includes a metal sheath on the penetrometer surrounding and spaced from said sleeve element, contact means electrically connecting said metal sheath to said sleeve element, means electrically connecting said sheath to said bottom ring member, spaced terminal prongs on said top ring member, respective resilient conductor means connecting said terminal prongs to said bottom ring member and to said electrode means, a pair of spaced terminal elements mounted in the wall of the pressure vessel and conductively engaging said terminal prongs, and additional respective conductor means connecting the spaced terminal elements to the capacitance indicating means.

8. The structural combination set forth in claim 7, and wherein said means connecting the metal sheath to the bottom ring member comprises a top flange on the sheath engaged beneath the bottom ring member.

9. The structural combination set forth in claim 8, and wherein said electrode means comprises a central headed metal pin extending through said cover member and exposed at its bottom end to the interior of the bell-shaped portion.

10. The structural combination set forth in claim 9, and wherein said resilient conductor means comprises a first spring arm secured to one of the terminal prongs and having a depending portion engaging said bottom ring member and a second spring arm secured to the other terminal prong and having a depending portion extending into the top ring member and engaging the head of said metal pin.

References Cited

UNITED STATES PATENTS

| | | | |
|---|---|---|---|
| 2,703,876 | 3/1955 | Edmundson et al. | 73—398 |
| 3,022,657 | 2/1962 | Hampton | 73—38 |

LOUIS R. PRINCE, *Primary Examiner.*

W. HENRY, *Assistant Examiner.*